May 16, 1961   W. B. WESTCOTT, JR   2,984,478
SPRING USING A COMPRESSIBLE SOLID
Filed Nov. 9, 1959

*INVENTOR.*
WILLIAM B. WESTCOTT, JR.
BY
*ATTORNEY*

United States Patent Office 2,984,478
Patented May 16, 1961

2,984,478

SPRING USING A COMPRESSIBLE SOLID

William B. Westcott, Jr., Cleveland Heights, Ohio, assignor to Cleveland Pneumatic Industries, Inc., Cleveland, Ohio, a corporation of Ohio Filed Nov. 9, 1959, Ser. No. 851,765

6 Claims. (Cl. 267—63)

This invention relates to springs and more particularly to a spring wherein a compressible solid is pressurized and compressed to absorb energy.

It is an important object of this invention to provide an improved spring device in which a solid material is compressed to absorb energy.

It is still another object of this invention to provide a spring including a compressible solid in combination with hydraulic means for applying pressure to compress the solid.

It is still another object of this invention to provide a high energy, lightweight spring which is substantially insensitive to temperature variations.

Figure 1:
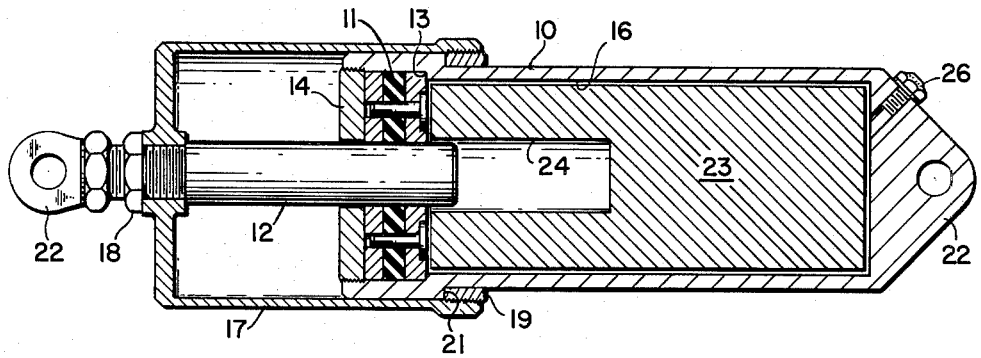
Figure 2:
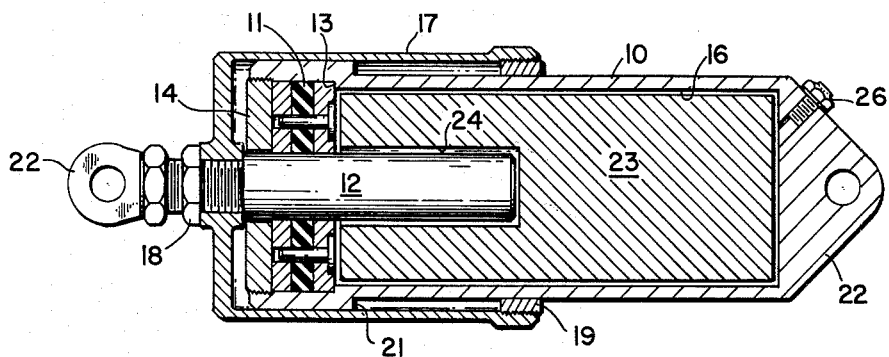

Further objects and advantages will appear from the following description and drawings, wherein:

Figure 1 is a side elevation in longitudinal section of a spring incorporating this invention showing the elements in the extended position; and Figure 2 is a view similar to Figure 1 showing the spring in the compressed position.

In order to provide high energy, lightweight springs, various means have been devised such as the liquid spring wherein liquid is compressed at relatively high pressures in the order of 40,000 to 50,000 pounds per square inch. Such springs have the disadvantage of being sensitive to temperature since the coefficient of thermal expansion for liquids is high when compared to the coefficient of expansion for the metallic spring housing. Thus, liquid springs have relatively limited application since the pressurization and spring rate of the device varies widely with temperature.

Another approach to the development of a high energy, lightweight spring has been to use a compressible solid totally contained within a vessel compressed directly by a plunger on one surface. In such springs of the type disclosed in the United States patent to P. H. Taylor, No. 2,681,800, only short strokes are possible because the solid is compressed by applying pressure to one face and no means are provided to magnify the stroke motion. An additional difficulty is presented by the fact that a single surface of the solid is compressed so a uniform stress distribution will not be transmitted through the solid material.

In a spring according to this invention, the same high energy levels of absorption can be achieved with a device having similar size and weight to that of a liquid spring. However, the spring is substantially insensitive to temperature variations. In the preferred spring, a compressible solid is completely emerged in a pressurizing liquid the pressure of which is varied by the stroking of a plunger. In effect, the liquid provides a hydraulic couple between the plunger and the compressible solid so that the solid is subjected to equal pressure on all of its surfaces. This results in the dual advantage of insuring equal distribution of the compressive forces on the solid material and also permitting the use of a relatively long stroke, small diameter plunger.

Referring to the drawings, the spring includes a cylinder 10 closed at its outer end by a seal assembly 11 and plunger 12. The seal assembly 11 can be of the type disclosed and claimed in the patent to Bingham, No. 2,308,149, and is held in position against a shoulder 13 by a gland nut 14. The seal assembly 11 provides a hydraulic seal between the cylinder 10 and the plunger 12 while permitting the plunger to move axially relative to the cylinder. Thus, a chamber 16 is defined within the cylinder 10 the volume of which is changed by axial movement of the plunger 12. To protect the plunger 12 and limit outward movement thereof, a housing 17 is threaded onto the outer end of the plunger 12 and locked in position by a lock nut 18. At its opposite end, the housing 17 is threaded to receive a stop nut 19 which engages a shoulder 21 on the cylinder 10 when the spring is in the extended position of Figure 1. Suitable mounting lugs 22 are provided on the cylinder 10 and the plunger 12 to connect the spring to the associated load.

A compressible solid 23 having a shape generally the shape of the chamber 16 is located in the chamber 16. The solid 23 is formed with a centrally located bore 24 adapted to receive the inner end of the plunger 12 when it moves to the compressed position of Figure 2. After the solid 23 is positioned within the chamber 16, the remainder of the chamber 16 is completely filled with a liquid which acts as a hydraulic couple to compress the solid 23.

The chamber 16 can be pressurized to any desired precharge pressure when the plunger 12 is in the extended position. To fill the chamber 16 with liquid, a charging fitting 26 is used. Because the chamber 16 is completely filled with a compressible solid and a liquid, movement of the plunger 12 to the right toward the compressed position of Figure 2 operates to increase the pressure of the liquid which is in turn transmitted to the compressible solid 23 and results in compression thereof.

The proportions of the solid should be such that a slight clearance is provided between the walls of the cylinder 10 and the solid 23 so that the compressible solid is completely immersed in the liquid. The use of this structure insures that the solid material will be compressed equally on all of its surfaces and does not have to flow plastically to achieve an even distribution of pressure.

Various compressible solids are contemplated but they should have a coefficient of expansion similar to the coefficient of expansion of the cylinder 10 so that increases in volume of the compressible solid due to temperature increases will be compensated for by increases in volume by the chamber 16 within the cylinder 10 caused by the expansion of the cylinder 10. An example of one compressible solid which can be used in this device is caesium which is compressible in the order of 16 percent at 70,-000 pounds per square inch. However, other solid materials, such as solid silicone, Teflon, or nylon, can be used. It is important, however, that the compressible solid be resilient and capable of returning to its initial density when the pressure is relieved so that the spring will function as an energy storage device and not an energy dissipation device. Since caesium has a coefficient of expansion which is smaller than steel, which is used to make the cylinder 10, the effect of temperature changes will not be significant. This is particularly true in view of the fact that the volume of the compressible solid within the chamber 16 is much greater than the volume of liquid contained therein. Therefore, even though the liquid may have a relatively high coefficient of expansion when compared to the cylinder 10, its effect will be of insignificance.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

I claim:

1. A spring comprising a hollow body having a chamber which is closed at one end and open at its other end, a plunger reciprocable through the open end of said chamber between extended and retracted positions, a packing assembly mounted in the open end of said chamber providing a hydraulic seal between said chamber and plunger, a compressible solid substantially filling said chamber, and liquid completely filling the remainder of said chamber whereby movement of said plunger into said chamber pressurizes said liquid and compresses said solid, said liquid having a volume when the plunger is extended at least substantially equal to the change in volume of said solid caused by movement of said plunger to said retracted position.

2. A spring comprising a hollow body formed of a material having a thermal coefficient of expansion, a chamber in said body which is closed at one end and open at its other end, a plunger reciprocable through the open end of said chamber between extended and retracted positions, a packing assembly mounted in the open end of said chamber providing a hydraulic seal between said chamber and plunger, a compressible solid having a coefficient of thermal expansion similar to said body substantially filling said chamber, and liquid completely filling the remainder of said chamber whereby movement of said plunger into said chamber pressurizes said liquid and compresses said solid, said liquid having a volume when the plunger is extended at least substantially equal to the change in volume of said solid caused by movement of said plunger to said retracted position.

3. A spring comprising a hollow body having a chamber which is closed at one end and open at its other end, a plunger reciprocable through the open end of said chamber between extended and retracted positions, a packing assembly mounted in the open end of said chamber providing a hydraulic seal between said chamber and plunger, a compressible solid substantially filling said chamber, liquid completely filling the remainder of said chamber whereby movement of said plunger into said chamber pressurizes said liquid and compresses said solid, said liquid having a volume when the plunger is extended at least substantially equal to the change in volume of said solid caused by movement of said plunger to said retracted position, and means mounted on said plunger engaging said body to limit outward movement of said plunger relative to said body.

4. A spring comprising a hollow container having a chamber which is closed at one end and open at its other end, a plunger reciprocable through the open end of said chamber between extended and retracted positions, a packing assembly mounted in the open end of said chamber providing a hydraulic seal between said chamber and plunger, a compressible solid substantially filling said chamber, liquid completely filling the remainder of said chamber whereby movement of said plunger into said chamber pressurizes said liquid and compresses said solid, said liquid having a volume when the plunger is extended at least substantially equal to the change in volume of said solid caused by movement of said plunger to said retracted position, and a housing mounted on said plunger engaging the outer surface of said container to limit outward movement of said plunger relative to said container.

5. A spring comprising a body formed with an axial bore open at one end, a plunger reciprocable in said bore, a fluid seal extended between said body and plunger co-operating therewith to define a fluid tight chamber between extended and retracted positions the volume of which is changed by reciprocation of said plunger, a cup-shaped member mounted on said plunger enclosing the open end of said body, stops formed on said member and body mutually engageable to limit movement of said plunger out of said chamber beyond a predetermined extended position, a cylinder formed of a compressible solid substantially filling said chamber, a bore in said chamber aligned with said plunger into which said plunger projects when it moves into said chamber, and liquid completely filling the remainder of said chamber, said liquid having a volume when the plunger is extended at least equal to the change in volume of said solid caused by movement of said plunger to said retracted position.

6. A spring comprising a cylindrical body formed with an axial bore open at one end, a plunger reciprocable in said bore, a fluid seal extended between said body and plunger co-operating therewith to define a fluid tight chamber between extended and retracted positions the volume of which is changed by reciprocation of said plunger, a cup-shaped member mounted on said plunger enclosing the open end of said body, stops formed on said member and body mutually engageable to limit movement of said plunger out of said chamber beyond a predetermined extended position, a caesium cylinder substantially filling said chamber formed with a bore aligned with said plunger into which said plunger projects when it moves into said chamber, and liquid completely filling the remainder of said chamber, said liquid having a volume when the plunger is extended at least equal to the change in volume of said solid caused by movement of said plunger to said retracted position.

References Cited in the file of this patent

UNITED STATES PATENTS

| | | |
|---|---|---|
| 2,560,005 | Shawbrook et al. | July 10, 1951 |
| 2,648,949 | Taylor | Aug. 18, 1953 |
| 2,873,964 | Hamilton | Feb. 17, 1959 |